June 18, 1968

L. P. HARRIS 3,389,359

CHANGE OF STATE CURRENT LIMITER DEVICES WITH STACKED
SEGMENT CONSTRUCTION

Filed April 19, 1967

Inventor:
Lawson P. Harris,
by John F. Allen
His Attorney.

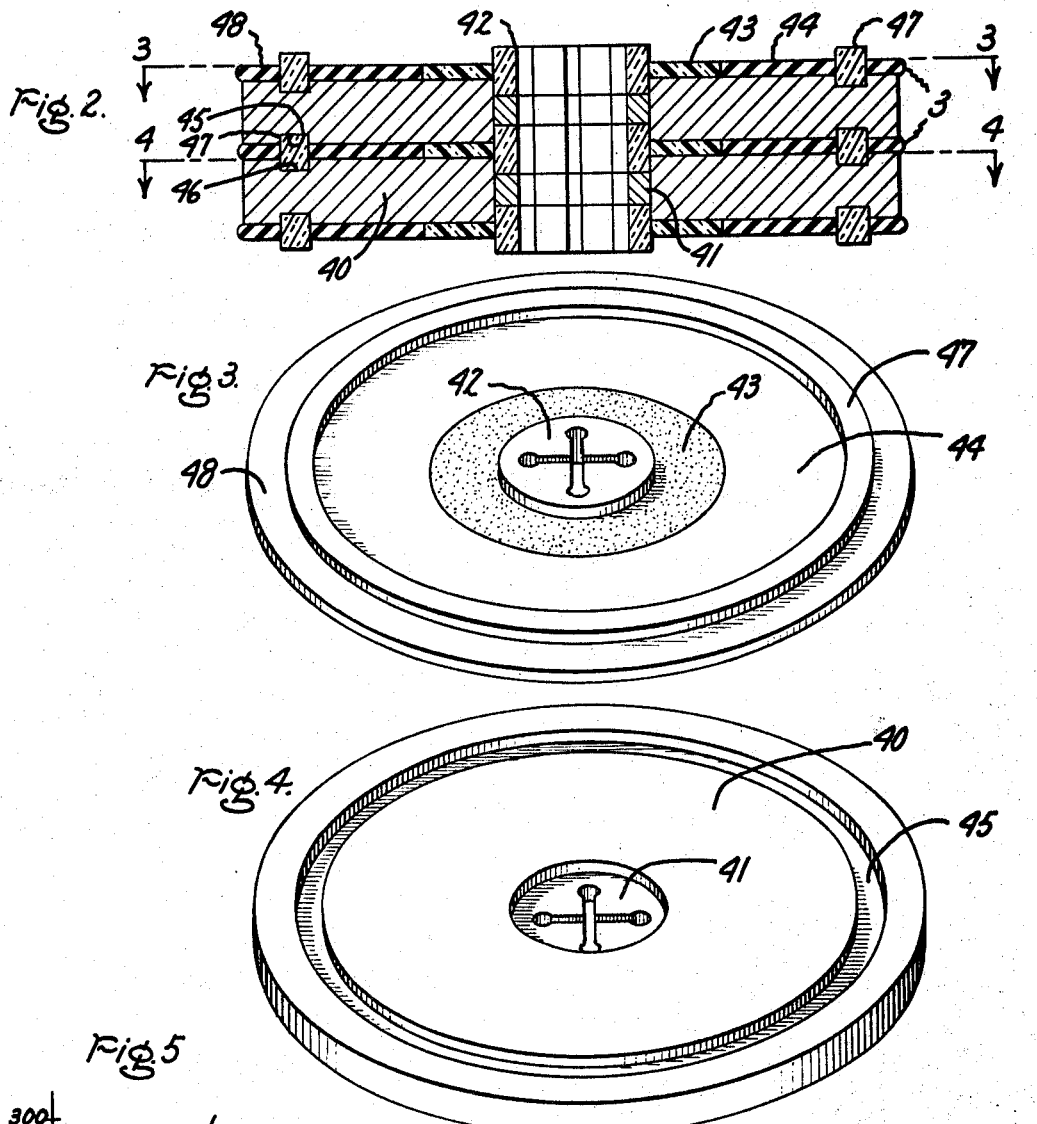

United States Patent Office 3,389,359
Patented June 18, 1968

1

3,389,359
CHANGE OF STATE CURRENT LIMITER DEVICES WITH STACKED SEGMENT CONSTRUCTION
Lawson P. Harris, Scotia, N.Y., assignor to General Electric Company, a corporation of New York
Filed Apr. 19, 1967, Ser. No. 632,049
10 Claims. (Cl. 337—114)

ABSTRACT OF THE DISCLOSURE

A self-recovering reusable current limiting device relies upon a change of state of a confined liquid metal to provide current limiting of a fault-current in an electrical circuit to facilitate circuit interruption. In the normal condition the limiter conductor is liquid and represents a minimal resistance. In the limiting condition the limiter conductor is in the vapor state and represents a relatively high resistance to the fault-current. The limiter conductor is confined within a chamber formed by alternating insulating and conducting members to provide a strong and flexible container which is held together in compression and which does not conduct electrically except through the limiter conductor.

---

Figure 1:
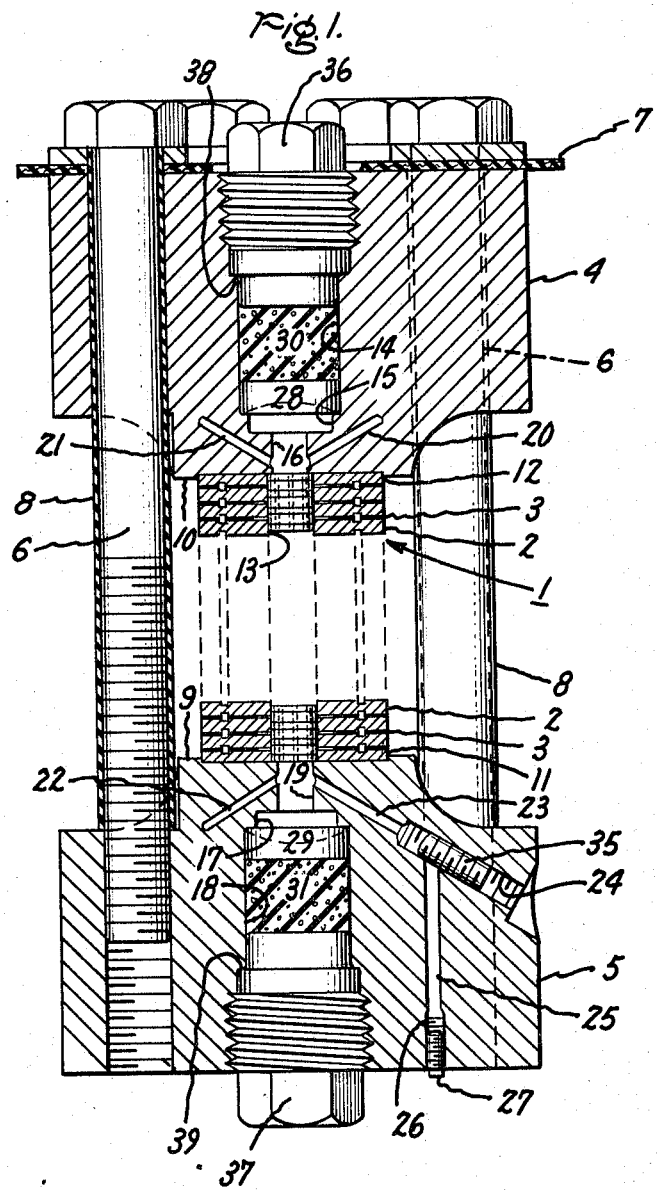

The present invention relates to fault-current limiting devices utilized in circuit interruption applications and, more particularly, relates to such devices which are self-healing and adapted for multiple usage and in which the current limiting function is provided by the change of resistance of a conductor which undergoes a change of state from liquid to vapor state upon the occurrence of a fault-current.

As power systems increase at all levels in size, power capability and strength and degree of interconnections, the possibility of destructive fault-current occurrences and the difficulty of protecting system components from the deleterious effects of destructively high fault-currents greatly increase. Such fault-currents represent a potential source of damage which requires circuit protection. In high voltage, high current applications, such protection may readily be obtained by the use of complicated and expensive circuit interrupters, circuit breakers and similar devices, the cost of which is readily justified by the inability to control the exceedingly high voltage and currents by any other means. At lower voltage levels, however, as for example, service lines and secondary lines wherein voltages may range up to 1000 volts, the use of such complicated and expensive mechanisms is not commercially feasible. Such circuits are generally protected by a combination of a current-limiting fuse and a relatively low power circuit breaker, as for example, a molded case type circuit breaker. In operation, when a fault-current occurs, the current limiting fuse lowers the current which is "seen" by the circuit breaker by a self-destructive dissipation of the transient peak thereby, so that the relatively low current that remains may be interrupted by the low current breaker without damage thereto or without the necessity of using an expensive mechanism. This system, however, requires that before the circuit breaker may be reset the current limiting fuse, which is destroyed in the limiting operation, must be replaced.

Recently, reusable, non-destructive current limiting devices have been developed, as for example, those set forth in U.S. Patent 3,117,203, issued Jan. 7, 1964, to R. L. Hurtle. Such devices rely upon the change of state of a conductor which is liquid in the cold or quiescent condition and vaporized in the high current or hot condition, thus causing a large increase in circuit resistance, which limits the current and allows for interruption by

2 a molded case type circuit breaker, for example. The former system, wherein the destructive current limiting fuse is utilized, has many applications in which it is ideally suited. Similarly the devices such as described by the aforementioned Hurtle patent are useful for relatively low voltages and currents and are quite satisfactory in that respect. It is, however, desirable that the power handling capacity of non-destructive change of state current limiting devices be extended and that the useful life of such devices be rendered more nearly optimum. It is also desirable so that the cost per interruption by decreased and the currents and voltages which may be interrupted by a combinations of such devices with a low power type circuit breaker may be vastly increased without substantially increasing the cost thereof.

Accordingly, it is an object of the present invention to provide change-of-state current limiter devices suitable for operation at high voltage and high currents.

Another object of the present invention is to provide non-destructive change-of-state current limiter devices which may be utilized at high voltage and currents and which are capable of self-healing operations for a large number of operations.

Yet another object of the present invention is to provide change of state current limiter devices capable of multiple use at high voltage and current which are inexpensive, relatively easy to manufacture, and suitable adapted for commercial usage.

In accord with the present invention, I achieve the foregoing objectives by providing a change-of-state limiter in which a metallic fault current conductor is confined within a longitudinal channel which extends through a plurality of stacked members which alternate between insulator and metallic reinforcing member. At each end of the stacked array of insulators and metallic members I provide a piston to maintain constant contact with the metallic current conductor irrespective of its physical state and provide for resilient means to keep the pistons in contact therewith, while allowing the piston to move reciprocally so as to allow expansion of the metallic current conductor with a change in state from liquid to vapor without causing undue increase in pressure within the chamber within which the metallic current conductor is confined.

In further accord with the present invention each piston and the means for maintaining it resilient, so that it always may be in contact with the metallic current conductor, is supported within a massive metallic header, one of which is juxtaposed at either end of the stacked array which contains the chamber for the metallic current conductor. The two opposed headers are fastened together mechanically but electrically insulated so as to maintain the members of the stacked array under sufficient compression to withstand any increase in pressure during change of phase of the metallic conducting member.

The novel features believed characteristic of the present invention are set forth in the appended claims. The invention itself, together with further objects and advantages thereof may best be understood with reference to the following detailed description taken in connection with the appended drawings in which:

FIGURE 1 is a vertical cross-sectional view of a change of state current limiter device constructed in accord with the present invention, FIGURE 2 is an expanded view of a portion of the stacked array of alternating conductors and insulators which constitutes the conducting metal confining means and defines the chamber within which the metal is contained in greatly expanded cross-sectional view, FIGURE 3 is a perspective view of a portion of the array of FIGURE 2 taken along section lines 3—3 of FIGURE 2, FIGURE 4 is a perspective view of a portion of the stacked array illustrated in FIGURE 2 taken along section lines 4—4 of FIGURE 2, and FIGURE 5 is a graph of representative electrical characteristics of devices of the invention.

In FIGURE 1 a stacked array 1 comprising alternate metallic strengthening members 2 and electrically insulating members 3 is held and supported between an upper header 4 and a lower header 5. Headers 4 and 5 are of high strength and impact resistance and should have a minimum yield strength of 100,000 p.s.i. and exhibit a 10% elongation at fracture, for example. They are maintained in physical position with a compressive force supplied by a plurality of compression bolts 6 of the same material or stainless steel which pass through unthreaded apertures in header 4 and are threaded into threaded apertures in header 5. Electrical insulation between headers 4 and 5 is maintained by insulating disc 7 atop header 4 and insulating sleeves 8 about bolts 6. In order to provide a smooth transition of compressive stress and apply the entire stress from the headers to the stacked array 1, the headers each have inwardly disposed mesa-like centers 9 and 10, respectively, which abut against the endmost segments 11 and 12, respectively, of stacked array 1. A channel 13 for containment of a metallic current conductor is cut longitudinally and axially through stacked array 1 and is formed by providing identical aligned apertures in each of the central members contained within the stacked array.

A large diameter longitudinal bore 14, terminating in a counterbore 15 of less diameter and a smaller-diameter bore 16 between counterbore 14 and surface 10 passes through header 4. A similar large diameter bore 17 with a counterbore 18 and small diameter bore 19 passes through the longitudinal axis of header 5. The diameter of bores 16 and 19 is conveniently slightly larger than the largest dimension of channel 13 which passes through the stacked array. A plurality of metallic, current conductor containing reservoirs 20 and 21 are diagonally cut into the body of header 4 from the cylindrical inner surface of bore 16. Similarly a plurality of such metallic containing tubulations 22 and 23 are cut diagonally into header 5 through the sidewall of bore 19 in header 5. One of these conductor-containing tubulations, 23, is joined by a larger diameter threaded counterbore 24 which in turn is joined by a filler bore 25 which is threaded at 26 and contains a set screw 27 and which joins the extended counterbore 24 entering header 5 from the end surface thereof. Bores 14 and 17 in headers 4 and 5, respectively, contain respective piston members 28 and 29 which are generally flat and planar but which may have a concave inner surface, to minimize the space occupied by the center thereof and maximize the surface abutting the walls of bores 14 and 17 for stability purposes. Pistons 28 and 29 are backed up with compressible members 30 and 31, which may conveniently be of closed-pore neoprene rubber, which allow for the pistons to be maintained resiliently in contact with the metal current conductor which constitutes the limiting media of the limiter device, irrespective of its phase state, be it liquid or vapor. This feature permits for an expansion of the fluid containing channel to accommodate for an increase of pressure within channel 13 due to a transition of the metallic current conductor from the liquid state to the vapor state. This accommodation helps prevent destructive pressure build-up within the limiter channel which could cause serious rupture problems in operation.

Hereinbefore the stacked array defining the fluid-containing channel of the limiter device of FIGURE 1 has been described merely as a set of alternating insulating and metallic members. Actually the structure of the stacked array is not quite that simple, although the fundamental concept thereof is of a plurality of metallic members suitable to withstand the expansive pressures generated by the change of state of the conducting fluid within the fluid-containing channel and a plurality of interposed insulators to provide electrical isolation between adjacent metallic support members, so that the only electrically conductive path between headers 4 and 5 is through the conductive metal contained within the channel. Since, however, due to the pressures generated at the transition from liquid to vapor phase there is a tendency for the vaporized metal to escape between interfaces of mating stacked members, the alternating metallic and insulating members are specifically designed to provide the optimum in sealing so as to maintain whatever pressure is built up within the channel and prevent the escape of vaporized metal therefrom.

In accordance with the present invention, the stacked assembly comprises an inner core of identical diameter, alternating, insulating and conducting members through which the current-conducting metal-containing channel is cut, and an outer member which surrounds the inner members and makes a tight compressive seal therewith. In FIGURE 2 the combination of three insulating assemblies and two conducting assemblies, each including inner and outer members, is illustrated in enlarged vertical cross-section. The conducting assemblies 2 comprise an outer annular ring 40 of high strength steel having a yield strength of at least 100,000 p.s.i. and a 10% elongation at fracture to guarantee impact strength, for example, having a central aperture therein which receives a slotted insert 41 of tungsten carbide which is precisely machined to fit tightly but without compressive force therein. Only a "press fit" is used. Typically, for a device rated at a voltage rating of 440 volts, tungsten carbide wafer 41 may for example be ½" in diameter and 0.050" in thickness. Insulating assembly 3 is somewhat more complex than conductive assembly 2. The center of insulating assembly is composed of a high density alumina wafer which in a 440 volt rated device may, for example, have an outside diameter of ½" and a thickness of 0.070". This material exhibits high dielectric strength and is particularly dense. Although other materials having high refractory ceramic properties are useful I have found that the high density alumina which is described and claimed in U.S. Patent No. 3,026,210—Coble, to be ideal for use in serving as a portion of the inner liquid containing vessel of the device in accord with the present invention. Exterior of alumina disc 42, there is disposed an annular washer 43 of lava, also known as pyrophyllite or soapstone, which may conveniently have an inside diameter of ½" and an outside diameter of ¾" and an unstressed thickness of 0.030". Exterior of lava washer 43, there is disposed a washer 44 of resilient insulating deformable member, conveniently neoprene rubber, which may conveniently have a ¾" inside diameter, a 1⅛" outside diameter and an unstressed thickness of 0.030" Steel annular washers 40 have an upper annular groove 45 therein and a lower annular groove 46 therein. These grooves are conveniently of a 1.125" inside diameter and a 1.250" outside diameter and are approximately 0.030" deep and are disposed concentrically and coextensively on opposite surfaces of steel washer 40. The space defined by mating annular grooves 45 and 46 is filled with a fiberglass washer 47 which has an inside diameter of 1.125" and an outside diameter of 1.250" and a thickness of 0.080" for example, in a 440 volt device as constructed in accord with the present invention. Exterior of fiberglass washer a second neoprene washer 48 or a washer of any suitable material for filling the space between the exterior of the two annular metallic support members 40, which washer has an inside diameter of approximately 1.250", a non-critical outside diameter, and an unstressed thickness of 0.030".

In FIGURE 3 of the drawing, a section along section lines 3—3 of FIGURE 2 is shown in perspective and illustrates the upper surface of the insulating assembly of the stacked array of FIGURE 2. As may be seen from the perspective view of FIGURE 3, lava washer 43 and neoprene washers 44 and 48 present a substantially planar surface while alumina center disc 42 and fiberglass annular ring 47 are raised above the plane defined by the other members.

In FIGURE 4 of the drawing, a section taken along section lines 4—4 of FIGURE 2 of the drawing illustrates, in perspective, the surface of the metallic assembly of stacked array illustrated in FIGURE 2. In FIGURE 4 it may be seen that the steel member 40 presents a planar surface and that tungsten carbide disc 41 is recessed below this plane as is annular groove 45 cut in the surface of steel washer 40. To assemble the insulating and metallic members of the stacked array as for example, the assemblies of FIGURE 3 and FIGURE 4, the illustrated perspective surfaces of FIGURES 3 and 4 are mated together with alumina disc 42, seating snugly within the recess within steel washer 40 and resting in intimate contact with tungsten carbide disc 41, with the central channel cut therein in perfect alignment with the central channel in member 41 so as to create a continuing channel for the containment of the metallic current conductor. Similarly the fiberglass washer 47 of FIGURE 3 fits snugly within groove 45 in the steel washer 40 of FIGURE 4. As may be noted from the cross-sectional view of FIGURE 4, the assembly is such that the intersection of the tungsten carbide washers 41 and the alumina disc 42 falls directly against a solid wall portion of steel washer 40, thus making any possible path for leakage between the channel and the exterior ambient long and circuitous. In further accord with the aforementioned aim to maintain a perfect seal against high pressures within channel 13, upon assembly of stacked array 1 of FIGURE 1 and tightening of bolts 6, the stacked array 1 is compressed so that the distance between adjacent steel washers 40 is reduced from approximately 30 mils to approximately 20 mils, a reduction of one-third. This reduction in thickness causes neoprene washer 44 and lava washer 43 to be stressed with great compressive forces. This is because fiberglass washer 47 effectively precludes the expansion of neoprene washer 44 outwardly and alumina disc 42 effectively prevents expansion of lava disc 43 inwardly.

At this point it should be noted that a particular characteristic of lava which makes its utilization in the structure of the stacked array unique and important is that, under intense pressure, lava flows. Thus when the intense pressure caused by the one third compression of the lava washer causes a flow, this flow results in lava filling any remaining space along the periphery of alumina washer 42. Thus any internally unfilled space is filled. The intense compression of the lava washer causes the lava to flow from the lava washer around the alumina disc.

The flow of the lava to seal the outside of the discs, utilizes only a relatively small amount of the lava present and does not relieve the compressive stress to which the lava washer 43 is subjected appreciably. Thus, washer 43 and washer 44 are under intense compressive stress and in fact, it is required that this stress be sufficient to completely counterbalance any expansive pressure which may be exerted upon the interior of washers 41 and 42 by a transition of the metallic current conductor within channel 13 from the liquid to the gaseous phase. By use of the herein-described structure, I am able to completely seal the stacked array of alternating insulating and metallic members of stacked array 1, which includes channel 13 for containment of the metallic current conductor, which changes phase in the operation of devices in accord with the present invention. Additionally, the placing the washers 43 and 44 in compressive stress gives the structure high impact resistance. This is essential, since the forces generated by a sudden occurrence of a fault current and the change of phase caused in the metallic current conductor result in intense thermal and mechanical shock to the structure. The built-in compressive stress is equal to this maximum shock and readily sustains the stress.

After insertion of pistons 28 and 29 and compressible means 30 and 31 within bores 14 and 17, the fluid containing system with the metallic conductor, header studs 36 and 37 are tightened to firmly abut against shoulders 38 and 39 with or without shim seals, as desired, to tightly seal the chamber from ambient without putting any compressive stress upon compressible members 30 and 31. Next, in assembly the individual members of the metallic and insulating members of stacked array are fitted together and the array is assembled and placed between headers 4 and 5. Bolts 6 are inserted and tightened to set the desired degree of compression in the deformable insulating members. The inner volume to be occupied by the filling metallic conductor is evacuated to a vacuum of for example $10^{-4}$ torr. Next this volume, including channel 13, bores 16 and 19, and counterbores 15 and 17, together with reservoirs 20, 21, 22, and 23 are then filled with a suitable conducting fluid, as for example mercury, although other low melting point metal, such as gallium, indium, the alkali metals or an alloy or mixture of a small quantity of alkali metal, as sodium, with mercury may be used, through filling tubulation 25 with the set screw 35 in counterbore 24 backed off so as to allow free communication between tubulation 25 and counterbore tubulation 24. After the entire volume as described hereinbefore has been filled with metallic conductor at a pressure several atmospheres, set screw 35 is tightened so as to close off the filling tubulation and ensure that the metallic conductive member is contained therein under a suitable pressure which may, for example be from one to 5 atmospheres to preclude any possibility of any portion of the fluid containing system not being filled.

In FIGURES 3 and 4 of the drawing it may be seen that the cross-section of channel 13 is essentially that of two orthogonally intersecting narrow slots terminated at the ends thereof by substantially circular channel edges. Typically, for a 400 volt current limiter, the thickness of the slot may be 0.320", the diameter of the circular channel edge being approximately 0.060". The channel is of uniform thickness and configuration from one end to the other. Although this configuration has been utilized successfully, in practicing the invention it is not unique and may be replaced by other suitable channel configurations. One prime criterion is that the channel should have a high surface-to-volume ratio, since the power that is dissipated within the device by virtue of the transformation of the fault current (which starts out substantially as an increasing sine wave) to the limiting current (which is essentially a slightly undulating, very low value as compared with the interrupted fault current), as well as the power of the limiting current so long as it exists, is dissipated by interaction between the arc existing in the vaporized metallic conductor and the walls of the channel. Theoretical and experimental experience have shown that the mechanism by which power is dissipated from the arc to the channel walls is essentially transferred by thermal radiation and that the arc temperatures are within the range of 10,000 to 20,000° K. At these temperatures, the vapor within the channel is substantially fully ionized and the major resistance to current flows results from electron-ion collisions. The experimental evidence which I have accumulated in testing devices in accord with the invention, indicates that the resistivity of the limiter conductor in accord with the present invention during current-limiting at the high temperatures mentioned above is approximately of the order of $1.5 \times 10^{-2}$ to $4.0 \times 10^{-2}$ ohms centimeters. From my experimental evidence I have determined, furthermore, that the energy balance for a unit length of arc channel equates the electrical energy dissipated to heat radiated to the relatively cool walls of the channel and is governed by the relationship $$E \cdot J = 4\left(\frac{\epsilon}{d}\right)\sigma T^4$$

where E and J are the voltage gradient and current density, $\sigma$ the Stefan-Boltzman constant, T the absolute temperature (which is assumed to be uniform throughout the channel) and $\epsilon$ the thermal emissivity of the arc and $d$ the "hydraulic diameter." The "hydraulic diameter" is defined as four times the ratio of volume-to-surface of the arc channel. The hydraulic diameter of a long cylinder equals the cylinder diameter. Similarly the hydraulic diameter of a thin slab equals twice the slab thickness. The hydraulic diameter measures the average distance radiation must travel to escape from an optically transparent body of any shape. Thus, the exact configuration of the channel need not be important so long as the hydraulic diameter of the configuration is appropriate. From my testing of devices in accord with the present invention I find that the hydraulic diameter which gives optimum results is approximately 0.080″. Thus if a long cylindrical channel were to be utilized it should have a diameter of approximately 0.080″. Similarly if a single thin slab is utilized as the channel it should have a thickness of approximately 0.040″. It find that the configuration illustrated in FIGURE 2 wherein the thickness of the slab is approximately 0.040″ and two slabs are utilized crossed orthogonally not only gives optimum surface-to-volume ratio relationship, but also ensures a greater probability of uniform temperature and pressure throughout the cross-sectional area of the channel. The rounded edges of the channels are utilized to ensure uniform pressure and thermal shock since the circular or cylindrical configuration is the one which gives greatest resistance to thermal and physical shock.

FIGURE 5 of the drawing illustrates a set of curves which indicates certain theoretical considerations with practical implications for the construction of devices in accord with the present invention. As ordinate of the curve of the chart of FIGURE 4 I have plotted the ratio $E/\sqrt{\epsilon/d}$ in volts/cm.$^{1/2}$. As abscissa I have plotted the relationship $J/\sqrt{\epsilon/d}$ in amps/cm.$^{3/2}$ wherein the symbols utilized have the same significance as is set forth in respect to the foregoing equation. Equithermal lines are indicated in dashed lines intersecting plotted curves A–D, and indicate equilibrium temperatures of 2000, 5000, 10,000, and 20,000° K. The curve identified as Curve A is the theoretical plot of the characteristics of a fully ionized gas and Curves B, C, and D illustrate the characteristic of mercury vapor at 1, 10, and 100 atmospheres respectively.

The curves of FIGURE 5 indicate that there is a tendency for the arc column to have a positive incremental resistance at temperatures above approximately 10,000° K. and for the column to behave as a fully ionized gas. At lower temperatures where electron-atom collisions determine electron mobility, the incremental resistance tends to be negative. In between these regions is a voltage minimum determining the lowest arc voltage that can support a discharge. From FIGURE 4, therefore, the minimum voltage gradient for the arc sufficient to sustain a current limiting arc may be calculated. I prefer, in view of the information contained in FIGURE 4 and from some empirical measurements that indicate that the pressure within the arc channel subsequent to transition from liquid to vapor state is of the order of 5 to 10 atmospheres, to design the structure of devices in accord with the present invention so as to operate with an arc voltage gradient between 140 and 200 volts per centimeter. This places a limitation upon the lengths of the arc so that the arc may not be so long that for the given operating voltage the voltage gradient is less than 140 volts per centimeter. On the other hand, it is desirable to make the arc as long as in consistent with the foregoing criteria, so that the dissipation of energy from the arc channel walls, may be spread out over as great a length as possible to extend useful lifetime of the device. Another limiting factor, in construction of devices in accord with the present invention, is that the length of the arc channel and the cross-sectional diameter thereof must be such that the cold or non-operating resistance of the liquid within the arc channel should be of the order of several milliohms and approximately 1 milliohm or less.

Since the energy of the fault current interrupted and the energy stored by the limited current as it flows through the ionized liquid or vaporized metal is dissipated by erosion of the arc channel walls, it is desirable that the arc be extinguished as quickly as possible. In this respect it is convenient, and preferred, that the limiter be placed in series with a conventional circuit interrupting device as, for example, a molded case circuit breaker with a sufficiently rapid response to interrupt the limited current as soon as possible after the current has been reduced to a steady state value from the original fault current by the limiting action of devices in accord with the present invention. Oscillogram tests of limiter voltage and current tests upon devices constructed in accord with the present invention indicate that the transition from liquid to vapor phase or the transition from the cold resistance to the high resistance state and consequently the arrival at a condition of low current occurs within approximately $10^{-3}$ second. Accordingly, providing the circuit interrupter utilized in connection with the limiter devices of the present invention is sufficiently rapid in response, it is entirely feasible that with reasonable repetition the arc may be extinguished in several milliseconds. In actual devices constructed in accord with the present invention, a low power test on a 8 milliohm cold resistance device having an arc length of 0.59 centimeter and a steady state operating voltage of 100 volts limited a peak current of 1250 amperes in 0.30 millisecond. In a medium power test on a similar unit have a 6 milliohm cold resistance and a 6 centimeter arc length, a peak current of $13.8 \times 10^3$ amperes at a voltage of 660 volts was limited to a steady state low current within 1.0 millisecond. Other devices constructed in accord with the present invention provide satisfactory limiting operation at ratings ranging from 100 volts at 1000 ampere peak current capability to 600 volts, 160,000 ampere capability. Devices of this nature have been operated successfully for many current limiting operations without failure and have reproducibly reduced thousands of amperes of peak fault current to a current suitable for interruption by relatively simple, inexpensive molded case type circuit breakers within periods of time of approximately 1 millisecond.

Devices constructed in accord with the present invention operate substantially as follows. During normal operation when there is no fault current, normal current through the device occurs through the channel filled with liquid metal and the energy generated by the minimal resistance, a few milliohms, is dissipated through the walls of the device with little heating. Upon the occurrence of a fault current, a transient of very high current, which may vary up to hundreds of thousands of amperes, suddenly begins to build up within the liquid in the channel, causing rapid heating thereof. As the temperature of the liquid metal reaches a point at which its vapor pressure equals the filling pressure of the liquid metal, which may for example be 5 atmospheres, and would, in this instance, occur at a temperature at approximately 750° K., vapor bubbles begin to form within the column, restricting condition and further accelerating heating until an entire cross-section of the channel is filled with a quantity of vaporized metal. At this point an arc is struck across the vaporized portion of the channel, resulting in a rapid increase in pressure which drives the remaining liquid metal from the channel into reservoirs 15 and 18, and forcing pistons 28 and 29 outwardly, causing compressible members 30 and 31 to be compressed. Normally the degree of expansion of the volume of the fluid containing space including the arc channel and the space caused by the reciprocating motion of the pistons is approximately a factor of 5 from the total initial volume of the arc channel. This permits the steady-state pressure upon the establishment of a vapor arc to stabilize at a pressure which is believed to be approximately 5 to 10 atmospheres, thus precluding the necessity of the device being strong enough to resist very high pressures for a very long time as would happen, for example, if the metallic current conductor were not allowed to expand in volume. As the metallic current conductor is forced from the channel, it is not forced from slanted reservoirs 20, 21, 22, and 23 from which it has no escape. This metallic current conductor remains liquid and the interfaces between the liquid and the vapor in these reservoirs become the arc footpoints to sustain the high current arc existing within the channel during that period when the limited current flows.

The foregoing sequence occurs very rapidly. The time between fault occurrence and peak current (the time at which the first cross-channel bubble is formed) is typically approximately 0.10 to 1.5 millisecond, and a similar time interval occurs from the occurrence of peak current to the establishment of a stable limited current level. Thus, the internal between fault occurrence and the establishment of a stable limited current level may vary from several from several tenths millisecond to several milliseconds.

While the invention has been set forth herein with respect to certain embodiments and specific design structures therefor, many modifications and changes will readily occur to those skilled in the art. Accordingly, I intend by the appended claims to cover all such modifications as fall within the true spirit and scope of the present invention.

What I claim as new and desire to secure by Letters Patent of the United States is:

1. A change of state current limiter device adapted to change from a first low resistance condition in which current is carried therein by a liquid metal to a second high resistance state in which current is carried therethrough by the same metal in the vapor state and further adapted to return non-destructively and rapidly to said first state, and comprising:
    (a) Means for forming a container for said metallic conductor and including alternate metallic conducting assemblies interspaced between insulating assemblies in a stacked array with at least one hollow channel passing longitudinally therethrough,
    (b) Massive metallic members juxtaposed at respective ends of said stacked array providing support therefor, and containing a cylindrical aperture therein in longitudinal alignment with respective ends of said hollow channel,
    (c) Piston means within each of said end members providing means for containing said conducting metal within said channel, irrespective of its phase state,
    (d) Compressible means supporting said pistons resiliently in contact with said conducting metal and providing means for expanding the volume of said container for said metallic conductor to accommodate a change from the liquid state to the vapor state without undue increase in pressure within said container, and
    (e) Means securely connecting said massive metallic members together with sufficient compressive force to maintain the individual members of said stacked array under strong compressive stress.

2. The current limiter of claim 1 wherein both the metallic conducting assemblies and the insulating assemblies of said stacked array include a central disc containing an aperture therein which defines the cross-sectional shape of said hollow channel and at least one annular ring holding said disc in position.

3. The current limiter device of claim 2 wherein said insulating disc is surrounded by a plurality of compressible deformable annular concentric washer members, the outer of which is surrounded by a non-compressible non-deformable insulating annular ring which is interlocked with the annular ring surrounding said central conducting disc.

4. The current limiter device of claim 3 wherein said compressible deformable annular insulating washers are compressed in assembly to a value with respect to the original size as to establish therein a compressive stress which exerts an inward radial force at least equal to the outward radial force exerted by the force of change of state of said metal conductor within said channel during current limiting operation.

5. The current limiter device of claim 4 wherein one of said annular insulating washers is made of lava.

6. The current limiter device of claim 5 wherein the compressive force applied to compress said insulating washers is sufficient to cause said lava washer to flow and seal any existing apertures between said central discs and said annular washers.

7. The current limiter device of claim 2 wherein said central insulating disc is fabricated from high density alumina and said central metallic disc is fabricated from tungsten carbide.

8. The current limiter device of claim 2 wherein the annular metallic ring is high strength steel having an annular retaining ring slot therein and a non-deformable insulator is keyed into upper and lower slots on adjacent metallic annular rings to define a hollow annular volume therebetween, which volume is filled with at least two annular concentric insulating washers which during assembly are compressed to establish an inward radial force to resist outward radial forces generated during current limiting operation.

9. The current limiter of claim 8 wherein said compressive force is sufficient to withstand steady-state outwardly directed pressures of 10 atmospheres and concomitantly higher transient shocks during change of state of the metallic current conductor during current limiting operations.

10. The device of claim 8 wherein the inner insulating discs are high density alumina, the annular compressible insulating washers are of lava and neoprene rubber respectively and the non-compressible retaining ring is of fiberglass.

References Cited

UNITED STATES PATENTS

| | | | |
|---|---|---|---|
| 2,306,728 | 12/1942 | Heddaeus | 338—80 XR |
| 2,732,464 | 1/1956 | Ohl | 200—166 |
| 2,990,464 | 6/1961 | Otterstedt | 200—166 XR |
| 3,016,436 | 1/1962 | Lafferty | 200—166 XR |
| 3,117,203 | 1/1964 | Hurtle | 200—113 |
| 3,218,412 | 11/1965 | Casey | 200—113 |

BERNARD A. GILHEANY, *Primary Examiner.*

H. B. GILSON, *Assistant Examiner.*